United States Patent [19]

Aiba et al.

[11] Patent Number: 4,725,967

[45] Date of Patent: Feb. 16, 1988

[54] FREQUENCY CONVERTER FOR USE IN A LASER PRINTER

[75] Inventors: Masahiko Aiba; Minoru Sakama, both of Nara, Japan

[73] Assignee: Sharp Kabushiki Kaisha, Osaka, Japan

[21] Appl. No.: 889,873

[22] Filed: Jul. 28, 1986

[30] Foreign Application Priority Data

Jul. 30, 1985 [JP] Japan ................................ 60-169149

[51] Int. Cl.$^4$ ............................................. H04N 1/21
[52] U.S. Cl. .................................... 364/519; 346/160
[58] Field of Search ................ 364/519, 518; 346/160, 346/107 R, 108; 350/6.7, 6.8, 6.6; 358/302; 354/5, 6, 7, 10; 355/8

[56] References Cited

U.S. PATENT DOCUMENTS 4,535,342 8/1985 Ohara et al. ..................... 346/160
4,612,555 9/1986 Hongou et al. ................... 346/160

*Primary Examiner*—Arthur G. Evans
*Attorney, Agent, or Firm*—Birch, Stewart, Kolasch & Birch

[57] ABSTRACT

A frequency control device for use in a laser printer which comprises a modulator for modulating an original signal by a modulation signal so that the speed of the printing data of the laser printer is changed to compensate the change of the scanning speed of a light spot projected by a polygon mirror in the laser printer without using a f-$\theta$ lens.

4 Claims, 11 Drawing Figures

Fig. 7

| time block No. | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| O15 | ∅ | 1 | 2 | 3 | 4 | 5 | 6 | 7 | 8 | 9 | A | B | C | D | E | F | |
| O16 | 7 | 6 | 5 | 4 | 3 | 2 | 1 | 0 | 0 | 1 | 2 | 3 | 4 | 5 | 6 | 7 | |
| $f_{12}$ | 1/9 | 1/10 | 1/11 | 1/12 | 1/13 | 1/14 | 1/15 | 1/16 | 1/16 | 1/15 | 1/14 | 1/13 | 1/12 | 1/11 | 1/10 | 1/9 | ×f (Hz) |
| $f_C$ | 1/2 | 1/2 | 1/2 | 1/2 | 1/2 | 1/2 | 1/2 | 1/2 | 1/2 | 1/2 | 1/2 | 1/2 | 1/2 | 1/2 | 1/2 | 1/2 | ×f (Hz) |
| $f_\Delta$ | 1/18 | 1/20 | 1/22 | 1/24 | 1/26 | 1/28 | 1/30 | 1/32 | 1/32 | 1/30 | 1/28 | 1/26 | 1/24 | 1/22 | 1/20 | 1/18 | ×f (Hz) |
| $f_0$ | $\frac{1}{2}+\frac{1}{18}$ | $\frac{1}{2}+\frac{1}{20}$ | $\frac{1}{2}+\frac{1}{22}$ | $\frac{1}{2}+\frac{1}{24}$ | $\frac{1}{2}+\frac{1}{26}$ | $\frac{1}{2}+\frac{1}{28}$ | $\frac{1}{2}+\frac{1}{30}$ | $\frac{1}{2}+\frac{1}{32}$ | $\frac{1}{2}+\frac{1}{32}$ | $\frac{1}{2}+\frac{1}{30}$ | $\frac{1}{2}+\frac{1}{28}$ | $\frac{1}{2}+\frac{1}{26}$ | $\frac{1}{2}+\frac{1}{24}$ | $\frac{1}{2}+\frac{1}{22}$ | $\frac{1}{2}+\frac{1}{20}$ | $\frac{1}{2}+\frac{1}{18}$ | |
| ratio frequency of $f_0$ | 1.046 | 1.035 | 1.027 | 1.020 | 1.014 | 1.008 | 1.004 | 1.000 | 1.000 | 1.004 | 1.008 | 1.014 | 1.020 | 1.027 | 1.035 | 1.046 | | left end ← photosensitive member → right end center 1.05, 1.04, 1.03, 1.02, 1.01, 1.000

FREQUENCY CONVERTER FOR USE IN A LASER PRINTER

BACKGROUND OF THE INVENTION

1. Field of the Invention

The present invention relates to a device for use in a laser printer using a polygon mirror for light spot scanning on a photosensitive member and more particularly to a frequency converter for use in changing clock frequency for controlling print data speed corresponding to the change of the light spot speed due to change of the light projection angle of the polygon mirror.

2. Description of the Prior Art

In the laser printer, as shown in FIG. 1, a laser diode 1 is intermittently driven to emit pulsive laser light rays corresponding to the printing data and the pulsive laser light rays are focused onto a cylindrical photosensitive member 3 through a collimating lens 2. A rotating polygon mirror 4 and f-$\theta$ lens are disposed between the collimating lens 2 and the photosensitive member 3. The polygon mirror 4 causes the laser light beam to scan on the photosensitive member 3 in a rapid speed. The laser diode 1 is turned on and off corresponding to the rotation of a motor (not shown) which rotates the polygon mirror 4 so that desired parts of the surface of the photosensitive member 3 can be exposed by the laser light beam.

The f-$\theta$ lens 5 is provided by the following reason. As the rotation speed of the polygon mirror is kept constant by the motor (not shown), the light spot speed of the laser light on the photosensitive member 3 is faster away from the center towards the both side ends than the speed at the center of the photosensitive member 3, whereby the dot pitch becomes larger on both sides in the case that the printing data is applied at a constant speed. In order to make the calculation, it is assumed that a rotation plane mirror 6 is used in place of using the polygon mirror 4. It is noted that the error due to the replacement mirror is small. Assuming that the angle between the optical axis of the laser diode 1 and the plane mirror 6 is $\theta + 45°$, the distance x from the center S of the photosensitive member 3 to the spot position P is x=l tan 2$\theta$. Wherein $\theta$=wt, w; angular speed of the plane mirror 6. Accordingly the light spot speed v on the photosensitive member 3 is $$v(t) = dx/dt = 2wl \sec^2(2wt).$$

The light spot speed rate is $$[v(t)vt=0] = \sec^2(2wt).$$

The relation between the spot position and the light spot speed rate can be depicted in FIG. 3.

In order to correct the distortion of f (focus distance)-$\theta$(incident angle), the f-$\theta$ lens 5 is disposed between the rotation polygon mirror 4 and the photosensitive member 3. The f-$\theta$ lens 5 has such a characteristic that the light beam tends to be displaced inwardly as the light goes to the periphery of the mirror 4 so that the light beam from the laser diode 1 is focused on the photosensitive member 3 and the scanning distance is proportional to the scanning time.

The f-$\theta$ lens must have a specialized expensive structure which causes the cost of the laser printer to be expensive.

Therefore, it is strongly desired to provide an inexpensive f-$\theta$ correcting device.

One approach is to correct the f-$\theta$ distortion by changing the clock frequency of the pulses used for controlling the speed of the printing data corresponding to the light spot speed as shown in FIG. 3.

One known example device for the above purpose is shown in FIG. 4, wherein a clock pulse oscillator 7 and a frequency divider 8 ae used so that the frequency of the clock pulse of the oscillator 7 is divided and changed in the frequency divider 8 1% by 1%. The frequency divider 8 consists of seven stage flip flops so as to obtain eight kinds of frequency dividing ratios of 1/128 to 1/121 in response to the frequency change data signal applied to the terminals A, B and C, thereby producing the printing data clock pulse having desired clock frequencies from the terminal QG. However, in the conventional laser printer, a printing clock pulse of about 10 MHz is used, so that the pulse frequency of the oscillator 7 must be 1.28 GHz. However such high speed logic devices are not commercially available and therefore, the f-$\theta$ correction arrangement mentioned above is not available for the practical use.

SUMMARY OF THE INVENTION

An essential object of the present invention is to provide a frequency control device for use in a laser printer which can be fabricated by logic devices which are commercially available and operating almost same as the f-$\theta$ correction device mentioned above.

In order to accomplish the object of the present invention mentioned above, a frequency control device is provided for use in a laser printer for controlling the data printing speed of the laser printer which comprises an oscillator for generating pulses of a predetermined frequency, a frequency control device which comprises a variable frequency divider for dividing frequency of the pulses generated from the oscillator by a desired frequency dividing ratio, a modulator for modulating the output of said oscillator by the output signal from the variable frequency divider so as to provide a modulated signal and a band pass filter for deriving part of the frequency component of the modulated signal from the modulator for generating a clock signal for controlling the printing data, said clock signal having frequency of controlling the speed of the printing data.

In the arrangement mentioned above, the variable frequency divider divides the output frequency of the pulse of the oscillator with a relatively high change rate of the frequency. The modulator modulates the output pulses of the oscillator by the modulation signal which is the output of the variable frequency divider. Since the output signals thus modulated in the modulator have various kinds of frequency components, the band pass filter derives the pulse signal having the desired frequency component for controlling the speed of the printing data for compensating the scanning speed of the laser light spot of the printing data. Even though the output frequency of the variable frequency divider changes with relatively high rate, the frequency of the output of the band pass filter changes with a relatively low rate to obtain the desired frequency suitable to control the light spot speed of the laser printer.

According to the present invention, since the f-$\theta$ correction can be made using commercially available logic devices without using expensive f-$\theta$ lens, it becomes possible to reduce the cost of the laser printer.

BRIEF EXPLANATION OF THE DRAWINGS

FIG. 7 is a schematic diagram showing operation of the circuit arrangement of FIG. 1 with the change of the frequency depicted.

DETAILED DESCRIPTION OF THE PREFERRED EMBODIMENT

Figure 3:
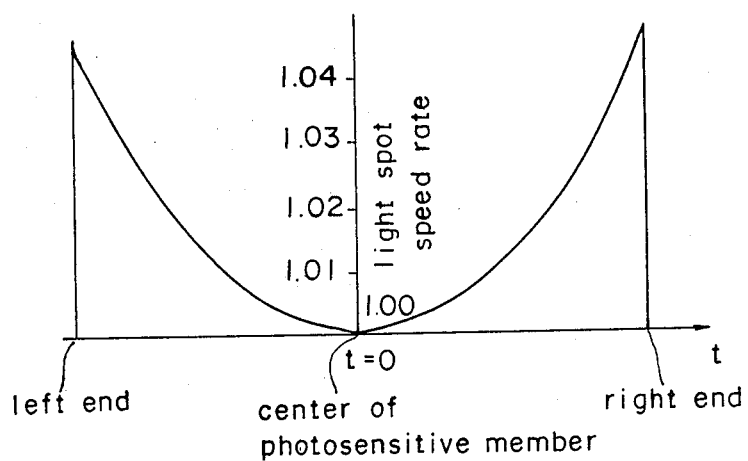
FIG. 3 is a schematic diagram showing the variation of the light spot speed with respect to the scanning position of the laser light.
Figure 5:
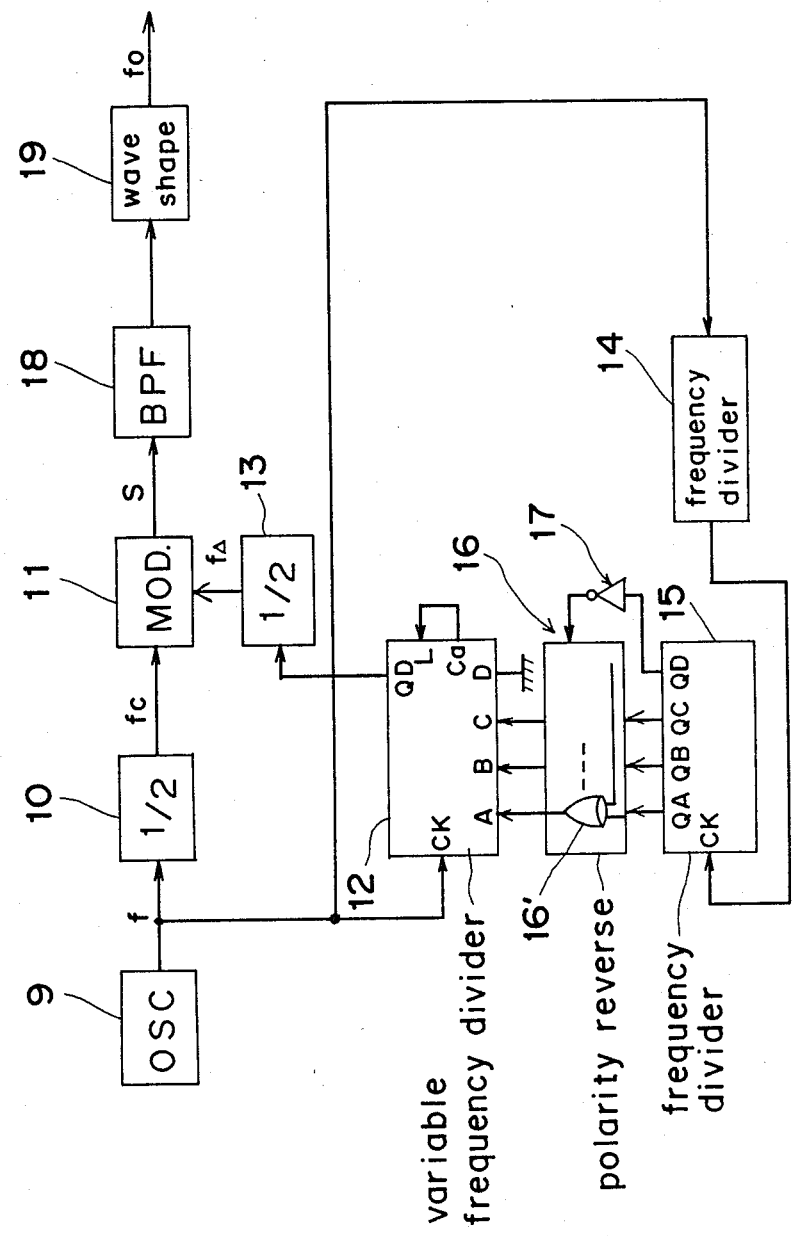
FIG. 5 is a block diagram of an example of a frequency control circuit according to the present invention.

Referring to FIG. 5, an oscillator 9 generates an original pulse train of a frequency f to a ½ frequency divider 10 composed of flip-flops (not shown) in which each output pulse of the oscillator 9 is shaped into a rectangular shape pulse with 50% of on-off duty. The output pulses of the frequency divider 10 are fed to a modulation circuit 11 as a signal fc to be modulated. The output pulses of the oscillator 9 are fed to a variable frequency divider 12 in which the frequency of the original pulses are divided by a predetermined frequency ratio indicated by a frequency change signal mentioned later. The output pulses of the variable frequency divider 12 are further converted into rectangular shape pulses with 50% duty in a second ½ frequency divider 13 and the converted pulses are fed to a modulation circuit 11 as a modulation signal fΔ. In the modulation circuit 11, the signal fc to be modulated fed from the first ½ frequency divider 10 is modulated by the modulation signal fΔ fed from the second ½ frequency divider 13. It is not essential that the clock frequency for deciding the data printing speed (referred to as print speed clock frequency hereinafter) coincides accurately with the bright point speed rate as shown in FIG. 3 but it may be sufficient to make the clock frequency nearly equal to the bright point speed rate stepwisely. Thus, in a third frequency divider 14, the frequency dividing ratio is set to divide the scanning period of the printing area equally into sixteenths as shown in FIG. 7. A fourth frequency divider 15 counts the 16 time blocks using the output of the third frequency divider 14 and produces the output of the result of the count in a form of a 16 number system. A polarity reversing circuit 16 is composed of a plurality of exclusive OR gates 16' so that the circuit 16 acts as the inverters connected to the three channels $Q_A$, $Q_B$ and $Q_C$ when the output $Q_D$ of the fourth frequency divider 15, which is applied to the polarity reversing circuit 16, is at a low level and as the buffers connected to the three channels when the output $Q_D$ is high level, thereby resulting in reversing the polarity with respect to the center S of the photosensitive member 3.

In the modulation circuit 11 an amplitude modulation circuit is used. In cases when the modulation signal fΔ and the signal fc to be modulated are respectively sine waves, the output signal S of the modulation circuit 11 can be expressed as $$S = \{1 + a \sin(2\pi f\Delta t)\} \sin(2\pi fct)$$

$$= \sin(2\pi fct) + \frac{a}{2}\{\cos 2\pi(fc - f\Delta)t - \cos 2\pi(fc + f_0)t\}$$

The output of the modulation circuit 11 has such frequency distribution as shown in FIG. 7. The frequency fc+fΔ can be derived from the frequency components by a band pass filter 18. In order to obtain a good result, preferably a balanced modulator may be used as the modulation circuit 11. In case the balanced modulator is used the output signal S is expressed by $$S = a \sin(2\pi f\Delta t) \cdot \sin(2\pi fct)$$

$$= \frac{a}{2}\{\cos 2\pi(fc - f\Delta)t - \cos 2\pi(fc + f\Delta)t\}$$

Figure 9:
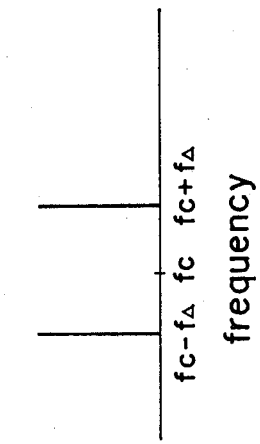
FIG. 9 is a schematic diagram showing the frequency spectrum of the output signal of the frequency control device shown in FIG. 5 in which a balanced modulator is used.

The output of the balanced modulator has such frequency distribution as shown in FIG. 9. In this case, since the component fc is absent, design of the band pass filter 11 may be easier.

Figure 11:
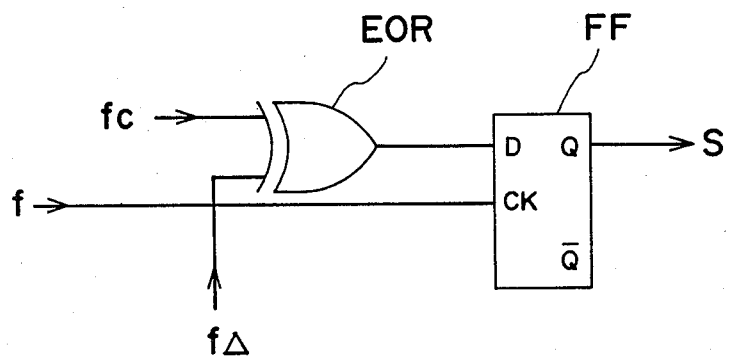
FIG. 11 is a schematic diagram showing an example of a balanced modulator using an exclusive OR gate and a flip flop.

Although various types of balanced modulators are commercially available, in the preferred embodiment of the present invention, the balanced modulator may be composed of an exclusive OR gate EOR and a flip flop FF which can operate under digital mode as shown in FIG. 11. Therefore, the modulation signal fΔ and the signal fc to be modulated must be a rectangular wave which is composed of the base frequency and its odd harmonic waves. Therefore, the output signal S of the modulation circuit 11 is expressed as $$S = (a_0 \sin w\Delta t + a_1 \sin 3w\Delta t + a_2 \sin 5w\Delta t \ldots) \cdot$$

$$(I_0 \sin wct + b_1 \sin 3wct + b_2 \sin 5wct \ldots)$$

wherein wΔ=2πfΔ, wc=2πfc.

Figure 10:
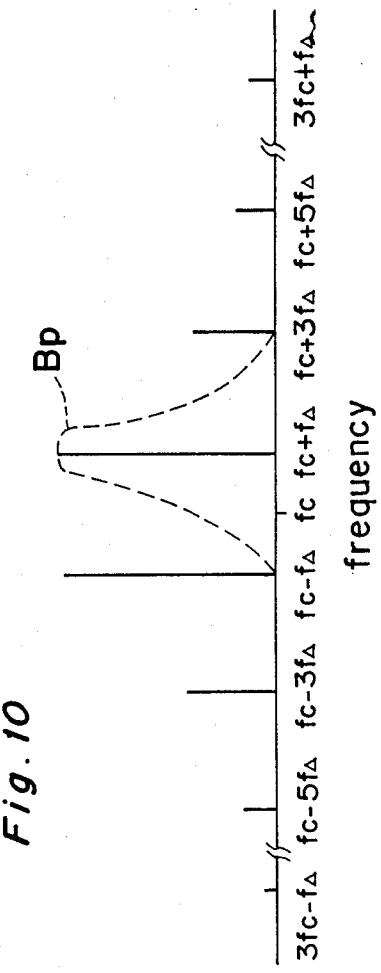
FIG. 10 is a schematic diagram showing the frequency spectrum of the output signal of the frequency control device shown in FIG. 5 in which the modulator is composed of exclusive OR gates.
Figure 8:
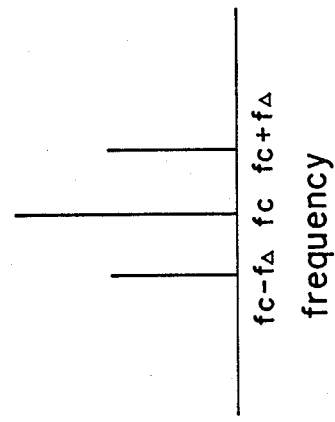
FIG. 8 is a schematic diagram showing the frequency spectrum of the output signal of the frequency control device shown in FIG. 5 in which an AM modulator is used.

In the above equation by performing the above mentioned conversion to the respective multiplication of the sine terms, the frequency distribution near the modulation signal fc becomes similar to the frequency distribution as shown in FIG. 9 and no problems occurs in the actual use. A desired signal may have a slight displacement of the frequency component near the frequency of fc+fΔ due to the operation of the variable frequency divider 10. However, the desired signal can be obtained by the band pass filter 18 so far as the band pass filter 18 has the frequency characteristic Bp shown by the dotted line in FIG. 10 The ideal characteristic of the band pass filter 18 is such that only the frequency fc+fΔ can be derived but the frequency component higher than fc+3fΔ and frequency component lower than fc−fΔ are excluded. The output signal of sine wave of the band pass filter 18 is converted into a pulse signal by the wave shaping circuit 19 so as to produce the clock frequency signal fO for printing as shown in FIG. 7. The ratio frequency fO in FIG. 7 shows the ratio of the frequencies at various position on the photosensitive member 3 with the frequency at the center of the photosensitive member 8 defined 1 and as shown in the lower half portion of FIG. 7, the ratio frequency is expressed in the stepped manner approximating the light spot speed ratio shown in FIG. 3. It is noted that in FIG. 7, 015 and 016 represent the outputs of the dividers 15 and 16 f12 represent the frequency dividing ratio of the divider 12.

Figure 1:
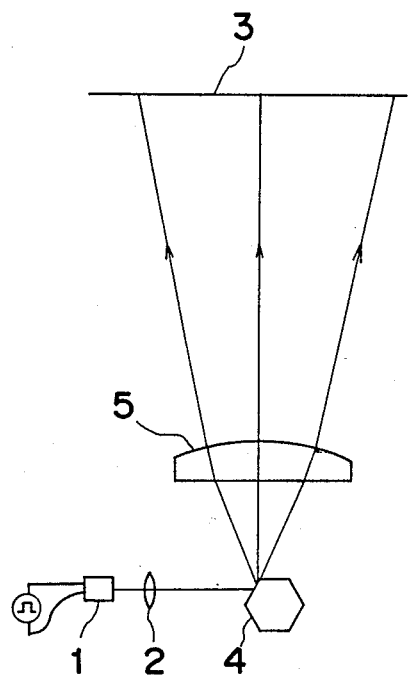
FIG. 1 is a schematic diagram showing general arrangement of a laser printer in which a polygonal mirror is used for scanning laser light
Figure 4:
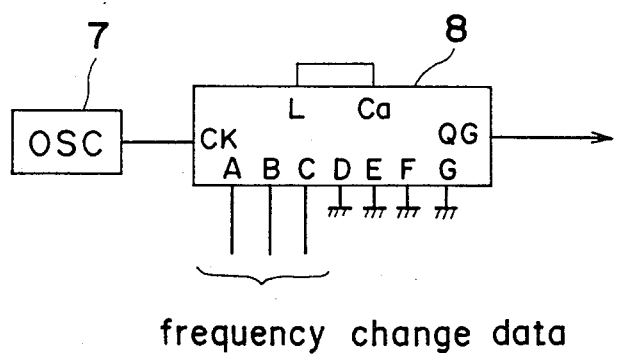
FIG. 4 is a block diagram of an example of a proposed frequency control circuit.
Figure 2:
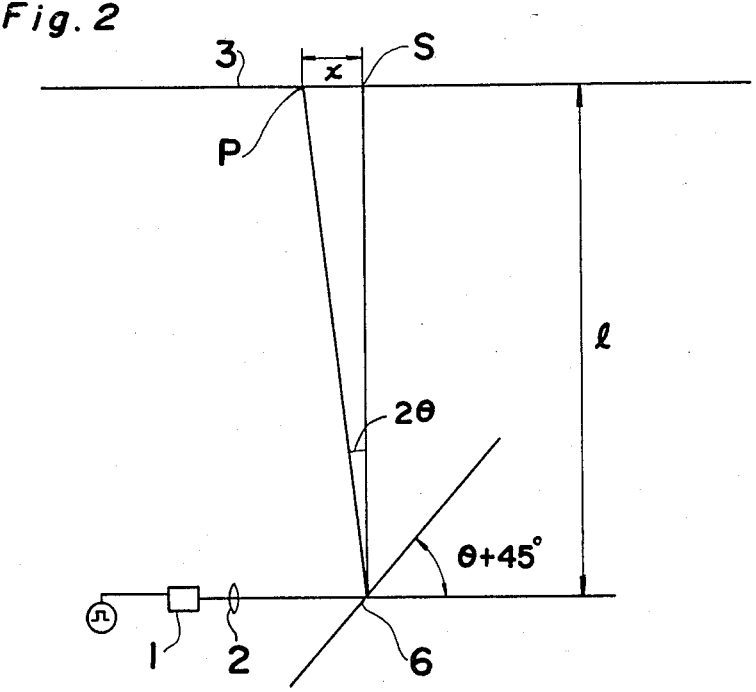
FIG. 2 is a schematic diagram showing a general arrangement of a laser printer in which a plane mirror is used for scanning the laser light.
Figure 6:
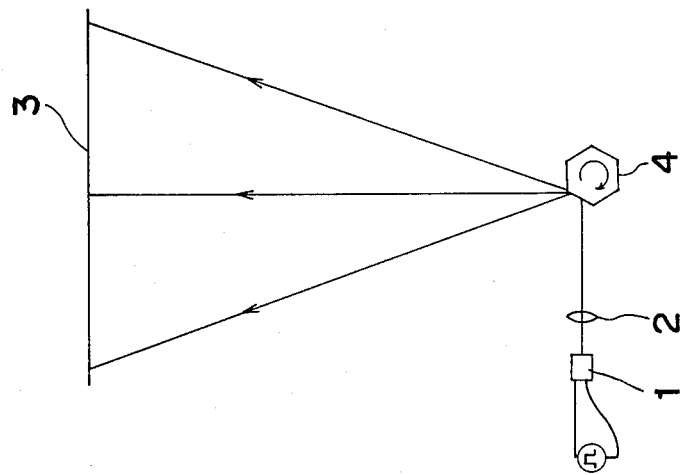
FIG. 6 is a schematic diagram showing an arrangement of the optical system used in the laser printer in which the frequency control device according to the present invention is used.

As the printing speed is controlled by the clock frequency signal, the printing speed can be changed corresponding to the light spot speed, whereby the dot pitch becomes uniformly independent of the position of the photosensitive member even if the f-θ lens 6 is omitted as shown in FIG. 6. In FIG. 6, like parts similar to FIG. 1 are represented by like reference numerals.

What is claimed is:

1. A frequency control device for use in a laser printer for controlling the printing data speed of the laser printer comprising:

oscillator means for generating pulses of a predetermined frequency;

variable frequency divider means for dividing the frequency of said pulses generated from the oscillator means by a desired frequency dividing ratio in response to a frequency control signal applied to said variable frequency divider means;

modulator means for modulating the output of said oscillator means by the output signal from the variable frequency divider means so as to provide a modulated signal; and band pass filter means for deriving a frequency component of the modulated signal of the modulator and generating a clock signal for controlling the printing of data, said clock signal controlling the speed of the printing of data.

2. The frequency control device according to claim 1, wherein the polarity of the frequency control signal is reversed according to whether the scanning position of the laser beam is situated on one side or another side of the center of the photosensitive member.

3. The frequency control device according to claim 1, wherein said modulator means comprises a balanced modulator using exclusive OR gates.

4. The frequency control device according to claim 1, wherein the signal from said variable frequency divider means supplied to said moduator means is changed in polarity according to whether the modulation signal is high or low.

* * * * *